July 13, 1954     J. F. HERSH ET AL     2,683,858
ELECTRICAL MEASURING APPARATUS
Filed Jan. 24, 1946     10 Sheets-Sheet 1

Inventors
JOHN F. HERSH
JAMES J. FARAN JR.
JOHN R. REITZ

By M. O. Hayes

Attorney

July 13, 1954   J. F. HERSH ET AL   2,683,858
ELECTRICAL MEASURING APPARATUS
Filed Jan. 24, 1946   10 Sheets-Sheet 4

Inventors
JOHN F. HERSH
JAMES J. FARAN JR.
JOHN R. REITZ
By M. O. Hayes
Attorney July 13, 1954  J. F. HERSH ET AL  2,683,858
ELECTRICAL MEASURING APPARATUS
Filed Jan. 24, 1946  10 Sheets-Sheet 5

FIG. 8b  $E_O$ IN PHASE

FIG. 8c  $E_O$ 90° OUT

Inventors
JOHN F. HERSH
JAMES J. FARAN JR.
JOHN R. REITZ
By M. C. Hayes
Attorney

Inventors
JOHN F. HERSH
JAMES J. FARAN JR.
JOHN R. REITZ

By
M. C. Hayes
Attorney

July 13, 1954  J. F. HERSH ET AL  2,683,858
ELECTRICAL MEASURING APPARATUS
Filed Jan. 24, 1946  10 Sheets-Sheet 7

Inventors
JOHN F. HERSH
JAMES J. FARAN JR.
JOHN R. REITZ

By M. C. Hayes
Attorney

July 13, 1954  J. F. HERSH ET AL  2,683,858
ELECTRICAL MEASURING APPARATUS
Filed Jan. 24, 1946  10 Sheets-Sheet 9

FIG. 15A

INVENTOR
JOHN F. HERSH
JAMES J. FARAN JR.
JOHN R. REITZ
BY
ATTORNEYS

July 13, 1954  J. F. HERSH ET AL  2,683,858
ELECTRICAL MEASURING APPARATUS
Filed Jan. 24, 1946  10 Sheets-Sheet 10

INVENTOR
JOHN F. HERSH
JAMES J. FARAN JR.
JOHN R. REITZ
BY
ATTORNEYS

Patented July 13, 1954

2,683,858

UNITED STATES PATENT OFFICE 2,683,858

ELECTRICAL MEASURING APPARATUS

John F. Hersh and James J. Faran, Jr., Cambridge, Mass., and John R. Reitz, State College, Pa.

Application January 24, 1946, Serial No. 643,158

10 Claims. (Cl. 324—57)

Our invention relates to impedance measuring devices and more particularly to methods of and means for representing graphically the magnitude of the resistive and reactive components of an impedance.

This application is copending with application, Serial Number 654,198, filed March 13, 1946, by John F. Hersh, James J. Faran, Jr., and John R. Reitz, now Patent No. 2,523,115.

A critical factor in the application of electromechanical transducers, filters, wave guides, antennas, etc. to electrical equipment is the impedance of these devices under varying conditions of frequency, applied voltage, etc. In particular, in the measurement of resonant circuits, such as those of underwater sound transducers, it has been customary to take a point-by-point measurement of the impedance of the transducer circuits as the frequency is changed over a range including the point of resonance of the transducer. Measurements of this type are essential to the effective application of the transducer.

Heretofore, the variation of an impedance with frequency has been obtained by analytical methods or by experimentation. Analytical methods are tedious and often inaccurate. They also demand simplifying assumptions, the validity of which may be questionable. Experimental methods, including the use of impedance and admittance bridges, solve the problem satisfactorily, insofar as accuracy and range are concerned, but are time-consuming and laborious. This is particularly true when a complex impedance locus passing through a resonance point is encountered.

It is particularly important, therefore, that a device be available capable of quickly plotting the impedance locus of a frequency sensitive element. In the interest of minimizing the time consumed and hence the expense of routine impedance measurements over a wide band of frequency, it is desirable that such a device be capable of plotting directly the impedance locus, thereby eliminating the need for converting the resulting measurements to the desired scale. The device should also be capable of plotting the impedance locus with a high degree of speed.

It is accordingly an object of our invention to provide a device capable of accurately, quickly, and conveniently plotting the complex impedance locus of a frequency sensitive element over a wide range of frequency.

It is a further object of our invention to provide a graph of the complex impedance locus of the impedance tested in a form suitable for visual obseravtion or a permanent record.

In accordance with our invention, the impedance to be tested is placed in a non-resonant circuit having an applied voltage of the frequency at which the measurement is desired, and capable of varying over the necessary frequency range. The voltage drop across the test impedance is resolved into two components, one corresponding to the component of voltage drop in phase with the current through the test impedance, and the other corresponding to the out of phase component of voltage drop. These two voltage components are then amplified and presented on a cathode ray tube screen, one component on one axis of the screen and the other component on the second axis of the screen.

In accordance with a further feature of our invention, the frequency of the voltage is rapidly varied throughout the range desired to be covered, thereby producing on the cathode ray screen, a single trace covering entire range of operation and which can be photographed or visually examined to determine the characteristics of the impedance under test.

Our invention also resides in features of construction, combination, and arrangement, whereby an accurate measure of impedance is obtained over a wide frequency range.

While our invention is susceptible of various modifications and alternative constructions, we have shown in the drawings and will herein describe in detail only the preferred embodiment. It is to be understood, however, that we do not intend to limit the invention by such disclosure, for we aim to cover all modifications and alternative constructions falling within the spirit and scope of our invention as defined in the appended claims.

In the figures:

2,683,858

Figure 15 A, B and C is a circuit diagram or the invention shown in block form in Figure 14.

Figure 1:
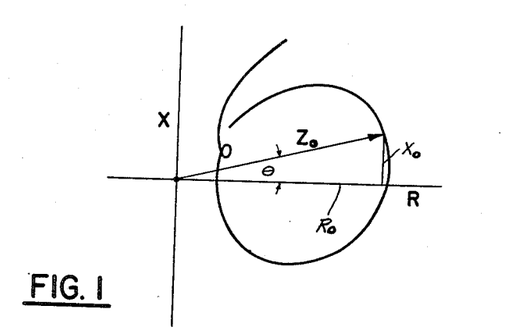
Figure 1 shows the presentation of impedance desired to be obtained by our plotter.

Referring now to Figure 1, which shows the desired presentation of the impedance. In the figure, X represents the axis of reactance, the distance of any point on the chart along this axis indicating the capacitive or inductive reactance of the circuit, and R represents the axis of resistance, distances along this axis indicating the resistive component of the impedance. In general, any impedance such as Z will have two components, one a reactive component indicated by a distance along the X axis, and the other a resistive component indicated by the distance along the R axis. These two components combine to determine a single point indicated by the tip of the vector Z. Inasmuch as variations in frequency alter the magnitude of the X and R components of the impedance, the tip of vector Z describes a locus as frequency is varied, this locus indicating the characteristics of the impedance being measured over the frequency range desired.

Figure 2:
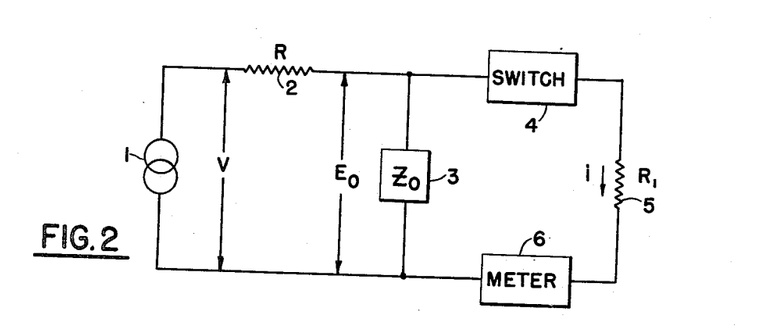
Figure 2 is a circuit diagram showing the basic principle of our invention.

The basic circuit of our invention is shown in Figure 2. In the figure, 1 indicates a constant voltage source of the particular frequency at which measurement is to be made. Resistance 2 and test impedance 3 are connected in series relationship across this voltage, the value of resistance 2 being very large with respect to the value of impedance 3. For these conditions, the current flow through impedance 3 is in phase with voltage 1 and is not influenced by either the magnitude or the phase angle of impedance 3. Hence the voltage appearing across impedance 3 is proportional in magnitude to impedance 3 and the voltage $E_0$ leads the current in phase by $\theta$, where $$\theta = \arctan \frac{X_0}{R_0}$$

which is the phase angle of $Z_0$. In order to detect the presence of the phase angle $\theta$ the circuit comprising switch 4, resistance 5, and meter 6 is provided.

Figure 3:
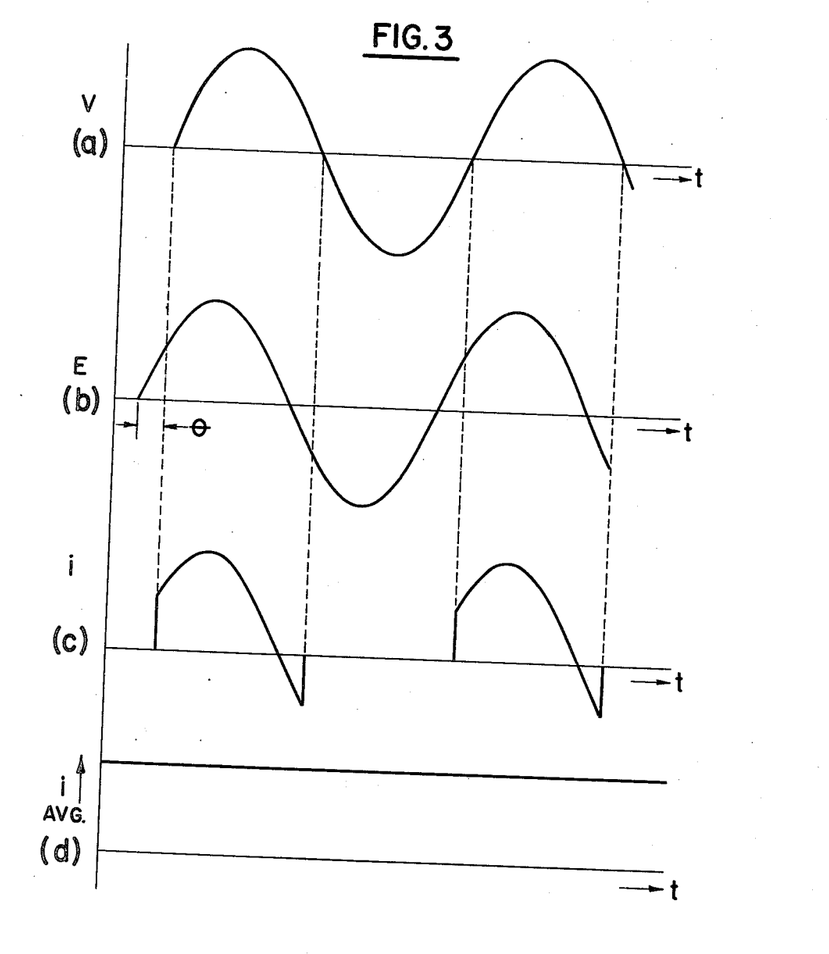
Figure 3 shows how the in phase component of the impedance is measured.

The operation of our circuit as shown in Figure 2 to detect the in-phase component of voltage across impedance 3, is illustrated in Figure 3. In the figure, curve (a) indicates the value of voltage V applied to the circuit of Figure 2. This voltage is a sine wave, having frequency corresponding to that of source 1. Curve (b) shows the voltage appearing across the impedance 3. This voltage lags or leads applied voltage V by a value determined by the relative reactive and resistive components of impedance 3, and has a magnitude proportional to the vectorial combination of these components of impedance 3, as indicated in Equation 1. For detection of the inphase component of voltage across impedance 3, we cause switch 4 to be closed only when voltage V is positive, thereby obtaining a current through resistor 5 of the wave shape shown in Figure 3(c). The average value of this current is:

(1) $\quad \bar{i} = KZ_3 \cos \theta$ where K is a constant of proportionality and $\bar{i}$ is the average current. This average current is then proportional to the resistive component of voltage drop across impedance 3, as shown in Figure 3(d).

Figure 4:
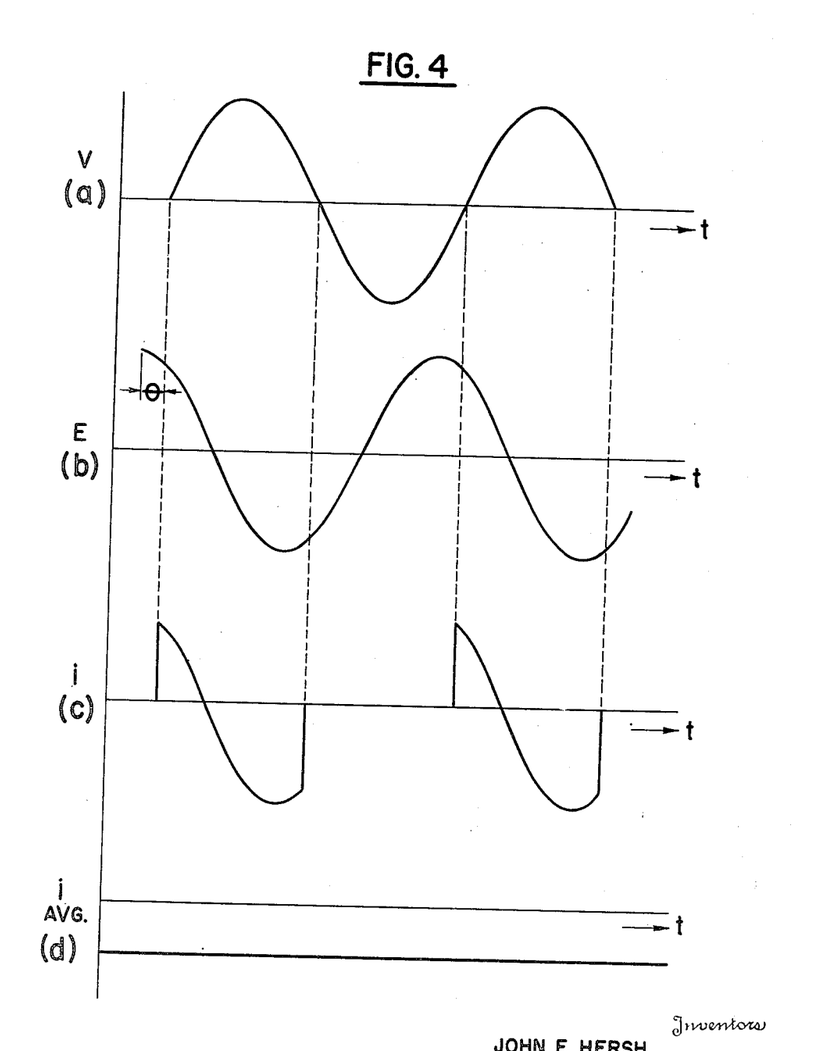
Figure 4 shows how the quadrature or out of phase component of the impedance is measured.

Figure 4 illustrates how we measure the quadrature component of impedance. In the figure, curve (a) shows the applied voltage V, which comprises a sine wave identical with that of Figure 3(a). Figure 4(b) shows the voltage appearing across impedance 3, but shifted by an angle of 90 degrees from the voltage shown in Fig. 3(b). This shift is obtained by a shifting circuit which will be described in further detail below. The curve of Figure 4(b) comprises a sine wave similar to that of Figure 4(a) except that it is shifted by an amount equal to 90 degrees plus the phase angle of impedance $Z_0$, and has a magnitude corresponding to the value of impedance 3. We apply voltage to resistance 5, Figure 2, only when voltage V is positive, thereby obtaining a current through resistance 5, Figure 2, similar to that shown in Figure 4(c). The average value of the current shown in Figure 4(c) is given by:

(2) $\quad \bar{i} = KZ_3 \sin \theta$

This average current is shown in Figure 4(d).

In the above discussion, the voltage E has been considered as shifted 90 degrees in phase with respect to the voltage V. The same operation may be obtained by shifting the voltage V applied to the resolver circuits. In general, we prefer to shift the voltage V for the reason that phase shift circuits can be adapted to operate more satisfactorily at a particular constant voltage and the voltage V is more nearly constant when a large number of tests are made than is the voltage E and any change in its amplitude is less disturbing than is a change in amplitude of E. It will be understood, however, that either can be used and is considered to be within the scope of our invention.

By applying the voltage shown in Figure 3(d), to the horizontal deflection plates of a cathode ray tube, we obtain a deflection from the zero axis proportional to the resistance component of impedance 3, Figure 2. In addition, by applying a voltage such as Figure 4(d) which is proportional to the quadrature component of this voltage across impedance 3, Figure 2, to vertical deflection plates of the same cathode ray tube, we obtain a deflection along the X axis proportional to the reactance of impedance 3. Hence the cathode ray tube screen is illuminated at a point corresponding to the resistive and reactive components of impedance 3, Figure 2.

Figure 5:
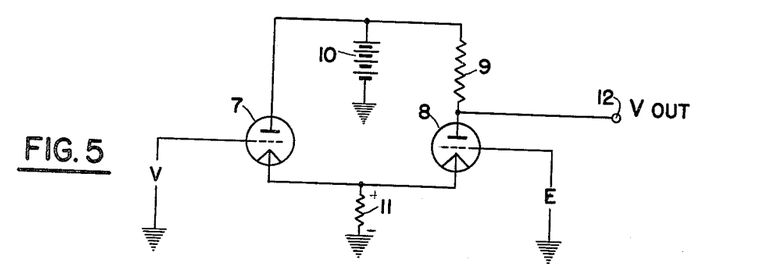
Figure 5 shows a resolver circuit operating on the principle of our invention.

The basic principle of a resolver circuit whereby our invention may be practiced is shown in Figure 5. In the figure, tubes 7 and 8, each having at least a cathode, grid, and anode, have a common cathode connection connected to ground by cathode bias resistance 11. Pentode tubes may be used as amplifiers for their high plate resistance. Direct voltage source 10 is connected to the anode of tube 7 and through resistance 9 to the anode of tube 8. Voltage output is taken from the anode of tube 8, point 12, to ground. The voltage V, Figure 2, is applied to the grid of tube 7, whereas the voltage across the impedance 3, Figure 2, is applied to the grid of tube 8.

Operation of the circuit of Figure 5 is as follows. When voltage V is positive, space current flow takes place through tube 7 and cathode bias resistance 11. The value of this resistance and the current flow through tube 7 is sufficient to cause tube 8 to be biased to cut-off, thereby preventing current flow through tube 8 and causing point 12 to assume the full positive voltage of direct voltage source 10. When voltage V goes negative, tube 7 is cut-off and no current flow takes place from this tube through cathode bias resistance 11. Voltage E then controls current flow through tube 8 and the voltage drop across resistance 9, thereby causing point 12 to follow the voltage E for this portion of the cycle.

Figure 6A:
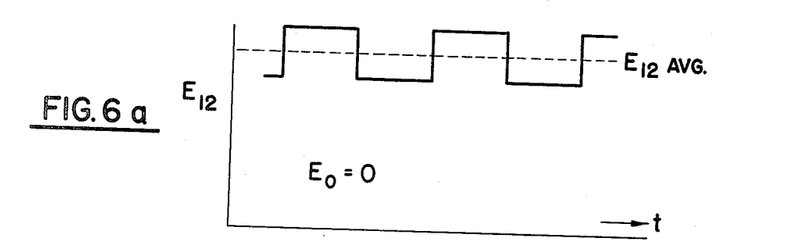
Figure 6 illustrates the operation of the resolver circuit of Figure 5.
Figure 6B:
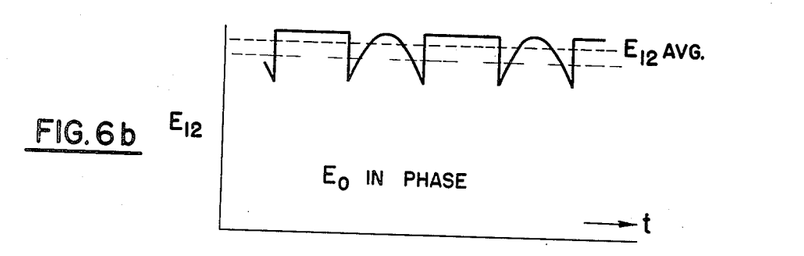
Figure 6C:
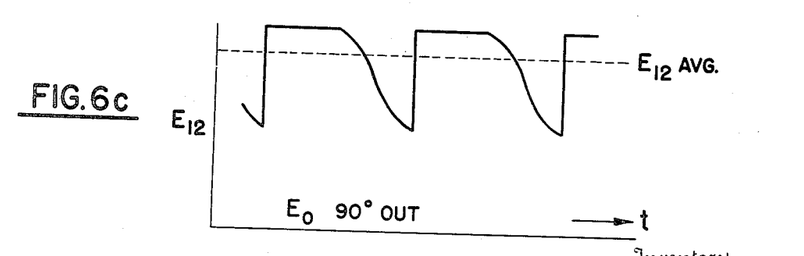

Figure 6 indicates the voltage of point 12 for various relations of the voltage E to the voltage V, voltage V being sinusoidal. In Figure 6(a), no voltage E is applied to the circuit and the voltage of point 12 passes from the full voltage value of direct source 10 to a lower voltage corresponding to the zero bias current flow through tube 8 and resistances 9 and 11. A square wave voltage is thereby produced having an average value midway between the two voltage conditions. Figure 6(b) shows the voltage output of the circuit of Figure 5 for the case where the voltage E is a sine wave in phase with voltage V and having a maximum value just sufficient to cause cut-off of tube 8. In this case, the portion of the cycle corresponding to negative values of voltage V causes full voltage of direct voltage source 10 to appear at point 12, thereby producing a condition identical with that of Figure 6(a). When voltage V goes negative, tube 7 is cut off and the voltage of point 12 follows a sine wave. As shown in the figure, this sine wave has a peak value equal to the voltage of battery 10 and having a shape corresponding to a half sine wave. The average value of voltage shown in Figure 6(b) is increased above the value shown in Figure 6(a) by an amount equal to the contribution of the half sine waves, in this case the increase being shown by the dashed line Figure 6(b). In Figure 6(c) the condition with the voltage E 90 degrees out of phase with respect to the voltage V and having the same magnitude as the voltage E in Figure 6(b), is shown. The voltage appearing at point 12 then assumes the shape shown in Figure 6(c) and has an average value equal to that shown in 6(a). This is indicated by the dashed line, Figure 6(c).

Figure 7:
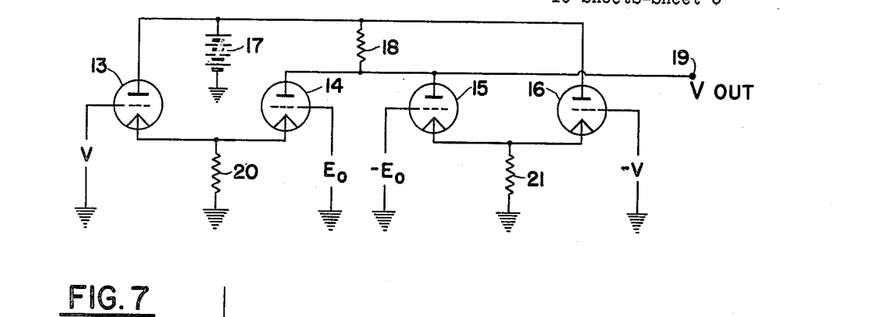
Figure 7 shows a full wave resolver circuit.

The circuit shown in Figure 5 and the performance shown in Figure 6 is essentially a half wave system since only half of the voltage wave across impedance 3 is utilized to produce voltage output. A full wave circuit, whereby superior performance may be achieved, is shown in Figure 7. In this figure, tubes 13 and 14 are arranged in a circuit similar to Figure 5, in which common cathode resistance 20 is utilized. Voltage V is applied to the grid of tube 13 and voltage E is applied to the grid of tube 14. The anode of tube 14 is connected through resistance 18 to direct voltage source 17, whereas the anode of tube 13 is connected directly to the source. The voltage appearing at point 19, therefore, corresponds to that shown in Figure 6 if only 13 and 14 are operating. Tubes 15 and 16 are disposed in a circuit similar to that of Figure 5 except that the grid of tube 15 is supplied with an inverse voltage equal to E and the grid of tube 16 is provided with an inverse voltage equal to V. The cathodes of tubes 15 and 16 are connected to ground by a common bias resistance 21 equal in value to that of resistance 20. The anode of tube 15 is connected to the direct voltage source 17 through resistance 18 and the anode of tube 16 connected to the direct voltage source 17 directly.

Operation of the circuits shown in Figure 7 is as follows, when the voltage V is greater than zero, tube 13 draws a high plate current, thereby causing voltage drop through resistance 20 which biases tube 14 to cut-off. Tube 16, however, is cut off by reason of the reversed voltage V applied to its grid which is negative when voltage V is positive. Hence tube 15 is responsive to the inverse of voltage E applied to its grid. A voltage drop through resistance 18 is therefore produced which corresponds to the current flow in tube 15 and hence the shape of the voltage E. When the voltage V goes negative, tube 13 is cut off and tube 16 conducts. Tube 15 is thereby biased to cut-off and tube 14 responds to the voltage E. Current flow through tube 14 therefore causes a voltage drop in resistance 18 and a corresponding voltage change at point 19.

Figure 8A:
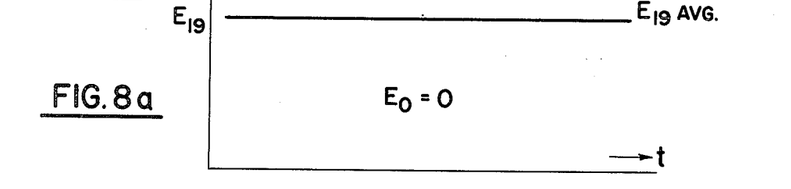
Figure 8 illustrates the operation of the resolver shown in Figure 7.
Figure 8B:
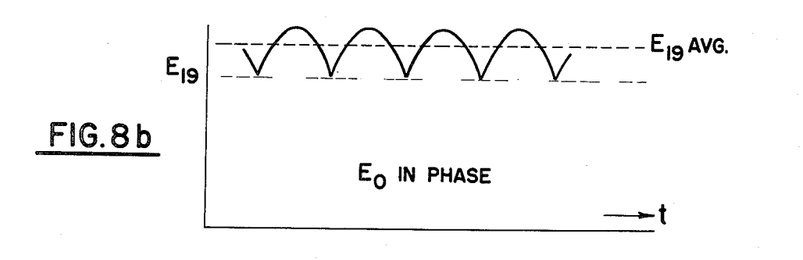
Figure 8C:
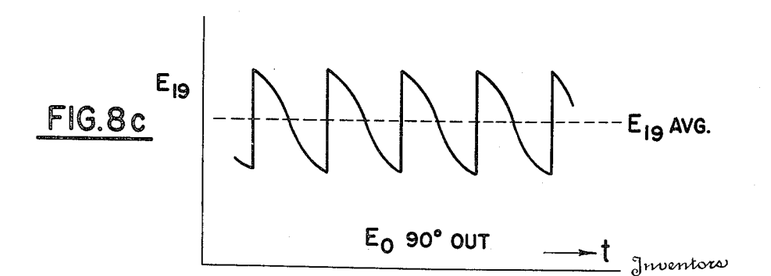

Operation of the circuit of Figure 7 is shown in further detail in Figure 8. In Figure 8(a), the voltage of point 19 is indicated for the condition of zero voltage E. When voltage V is positive, the voltage shown in Figure 8(a) corresponds to the no bias current flow through tube 15, whereas when voltage V is negative, the voltage shown in Figure 8(a) corresponds to the no bias current flow through tube 14. Inasmuch as the construction of each group of tubes is identical, the constant voltage shown in the figure is produced at point 19. Figure 8(b) illustrates the voltage appearing at point 19 when the voltage E is in phase with the voltage V and of magnitude just sufficient to cause cut-off of tube 14 or tube 15 at the peak value. The voltage appearing at point 19 then becomes a series of half sine waves displaced from the origin. In Figure 8(c) the voltage corresponding to the condition when voltage E is 90 degrees out of phase with respect to voltage V and of the same magnitude as shown in Figure 8(b) is shown. In this case, the voltage at point 19 comprises a series of broken sine waves, having an average value equal to the value shown in Figure 8(a).

Figure 9:
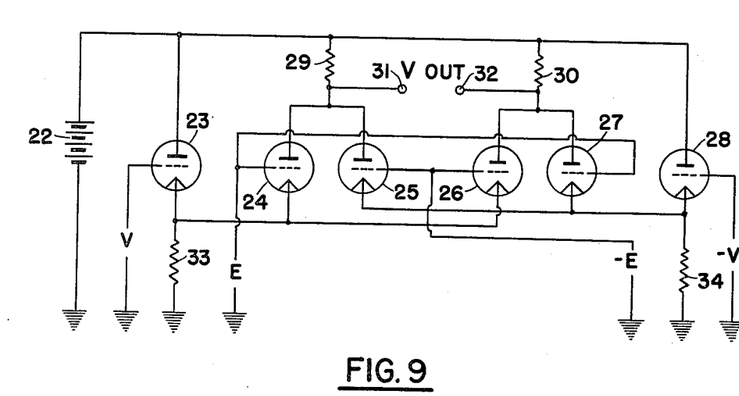
Figure 9 shows the combination of two full wave resolver circuits to achieve a balanced voltage output.

In the application of the resolved voltage such as that derived from the circuit of Figure 8 to a cathode ray tube, it is desirable to have a voltage symmetrical with respect to ground potential. Figure 9 shows a circuit whereby this voltage may be achieved. In the figure, tubes 23, 24, 25, 26, 27, and 28 are of construction similar to tubes 13, 14, 15, and 16, Figure 7. Resistance 33 is a common cathode bias resistance for tubes 23, 24, and 26, while resistance 34 is a common cathode bias resistance for tubes 25, 27, and 28. The anodes of tubes 23 and 28 are connected directly to direct voltage source 22, whereas the anodes of tubes 24 and 25 are connected to the direct voltage source through resistance 29. Output voltage is taken across points 31 and 32. The voltage V is applied to the grid of tube 23 whereas the inverse voltage V is applied to the grid of tube 28. The voltage E is applied to the grids of tubes 24 and 27, whereas the inverse voltage E is applied to the grids of tubes 26 and 25. The operation of our circuit shown in Figure 9 is as follows:

If the voltage V is positive, current flow through tube 23 causes a voltage drop in resistance 33 which biases tubes 24 and 26 to cut-off, thereby preventing current flow through either of these tubes. However, the negative voltage V applied to tube 28 biases it to cut-off so that it causes no current flow through resistance 34. Tube 25 therefore carries plate current in accordance with the negative value of voltage E, and tube 27 carries plate current in proportion to the voltage E. This causes point 31 to swing positive in proportion to the value of voltage E and point 32 to swing negative in proportion to the value of voltage E. When the voltage V swings negative, tube 23 is cut off, thereby permitting operation of tubes 24 and 26. Current flow through tube 24 corresponds to the value of the negative voltage E, whereas current flow through tube 26 corresponds to the positive value of the voltage V. Point 31 then swings in the positive direction in accordance with the value of voltage E and point 32 in the negative direction in proportion to the value of voltage E. The negative voltage swing of voltage V causes tube 28 to conduct, thereby causing a voltage drop in resistance 34 which cuts off tubes 25 and 27.

The voltage across points 31 and 32 may be directly applied to the electrostatic deflection plates of a cathode ray tube to obtain a deflection corresponding to the in phase component of the voltage E.

Figure 10:
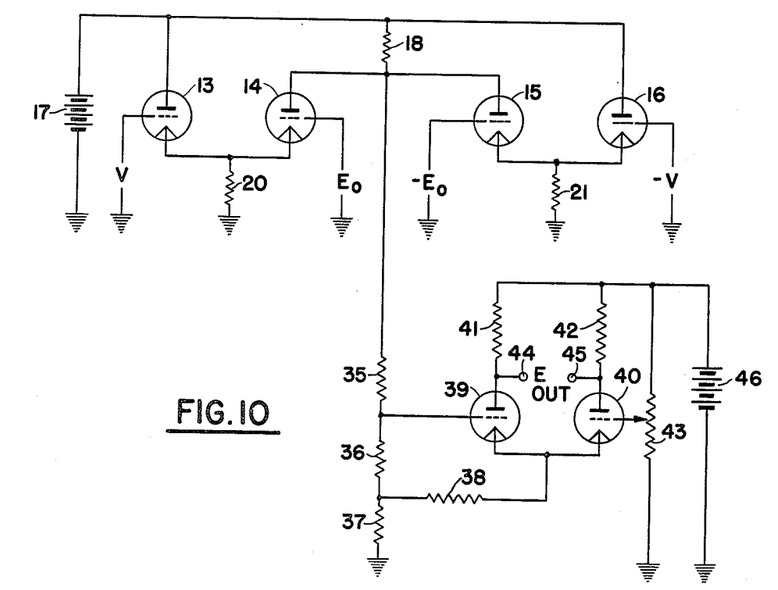
Figure 10 shows the production of a balanced output voltage from a single full wave resolver circuit and a balanced amplifier.

An alternative method whereby a balanced voltage may be obtained for operation of a cathode ray tube is shown in Figure 10. In this case, the full wave circuit shown in Figure 7 is used to actuate a push-pull cathode coupled amplifier. The plates of tubes 14 and 15 are connected through resistance 35 to the grid of push-pull tube 39 and resistances 36 and 38 to the cathode. The common point of resistances 36 and 38 is connected to ground through resistance 37. Variable resistance 43 is adapted to control the direct voltage at the grid of tube 40. Resistances 41 and 42 connect the anodes of tubes 39 and 40 respectively to direct voltage source 46. Output voltage is taken across the points 44 and 45 connected to the anodes of tubes 39 and 40 respectively. In operation, a positive voltage swing appearing at the anodes of tubes 14 and 15 causes the increased plate current flow through tube 39 and a decreased potential at point 44, voltage drop in resistances 37 and 38 decreases current flow through tube 40 and gives correspondingly increased value of voltage at point 45. A negative voltage swing has the reverse effect. Hence the circuit acts to provide a balanced output from the unbalanced voltage at the anodes of tubes 14 and 15.

The circuit shown in Figure 10 has the advantage of providing a ready means of adjusting the voltages appearing at points 44 and 45 and is therefore particularly suitable for use with a cathode ray tube.

Figure 11:
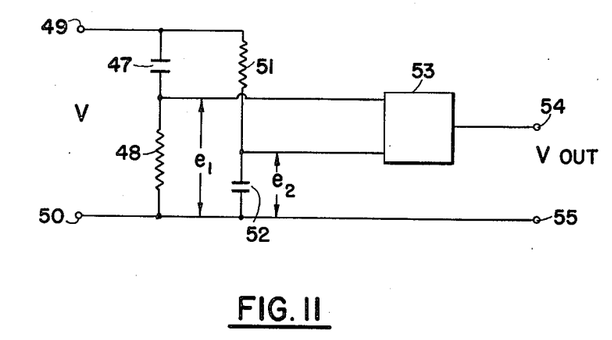
Figure 11 shows a phase shift circuit whereby frequency changes are prevented from influencing operation of the phase shift portion of our system.

In the preceding discussion, the operation of our circuit as a means of obtaining the in phase component of voltage drop across impedance 3, Figure 2, has been described in detail. The quadrature component of voltage across impedance 3 may be obtained by the use of identical circuits except that a 90 degree phase displacement is applied to voltage V before it is inserted into the resolver circuits. This can be accomplished by a circuit such as shown in Figure 11. In this circuit, condenser 47 and resistor 48, and condenser 52 and resistor 51, are provided across voltage V. The voltage $e_1$ obtained from resistor 48 and condenser 47 and the voltage $e_2$ obtained from resistor 51 and condenser 52 are applied to differencer circuit 53, and the resulting output taken across points 54 and 55. This produces a voltage at points 54 and 55 proportional to the magnitude of the voltage across points 49 and 50, but differing in phase by an angle of 90 degrees.

Figure 12:
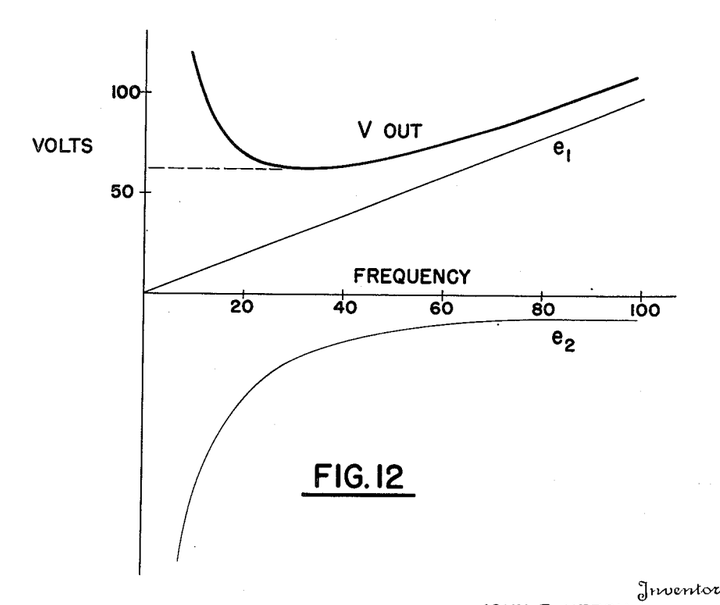
Figure 12 illustrates the operation of the circuit shown in Figure 11.

Figure 12 shows the operation of the circuit of Figure 11 over a considerable frequency range. The voltage $e_1$ is directly proportional to frequency, whereas the voltage $e_2$ is inversely proportional to frequency. The difference between these two voltages passes from a relatively high value at low frequency to a minimum at the point where:

(3) $$W R_{48} C_{47} = \frac{1}{W R_{51} C_{52}}$$

It then slowly rises as frequency is increased. By designing the circuit of Figure 11 to have the minimum value of output voltage close to the average frequency to be used, we achieve a 90 degree phase displacement which is independent of frequency and which produces an output voltage nearly independent of frequency.

Figure 13:
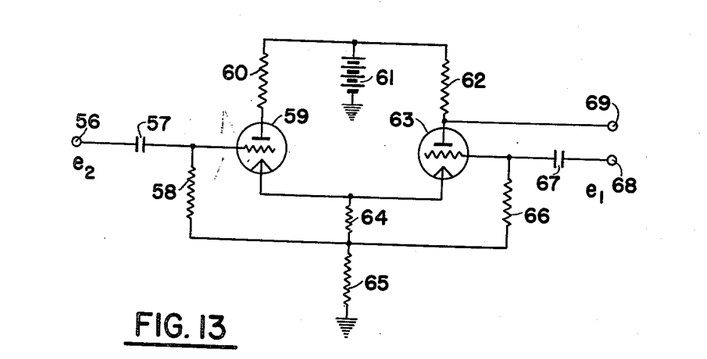
Figure 13 shows a differencer circuit adapted to operate with our phase shift circuit of Figure 11.

Figure 13 shows a differencer circuit adapted to be used with the phase shifter of Figure 11. In the figure, the voltage $e_2$, Figure 11, is applied to point 56 which is connected by coupling condenser 57 to the grid of tube 59. Similarly the voltage $e_1$ is applied to point 66 and to the grid of tube 63 through coupling capacitor 67. The cathodes of tubes 59 and 63 are connected to ground through a common cathode resistance 64 and 65. The plates of tubes 59 and 63 are connected by means of resistances 60 and 62 to direct voltage source 61. Output voltage is taken from point 69. When no voltage $e_2$ is applied, the current flow through tube 63 is determined by the applied voltage at point 68 ($e_1$) and the voltage drop across resistance 62 is proportional to this current. If a negative voltage $e_2$ is applied to point 56, the current flow through tube 59 is reduced thereby, and a lower voltage drop takes place through cathode bias resistances 64 and 65. This causes a corresponding increase in current through tube 63 and increased voltage drop across resistance 62. On the other hand, if a positive voltage $e_2$ is applied to point 56, increased current flow through tube 59 causes greater voltage drop through resistances 64 and 65, and hence a lower current to tube 63. The voltage drop across resistance 62, therefore, is proportional to the difference in voltage between $e_1$ and $e_2$. This automatically gives a voltage output curve similar to that shown in Figure 12.

Figure 14:
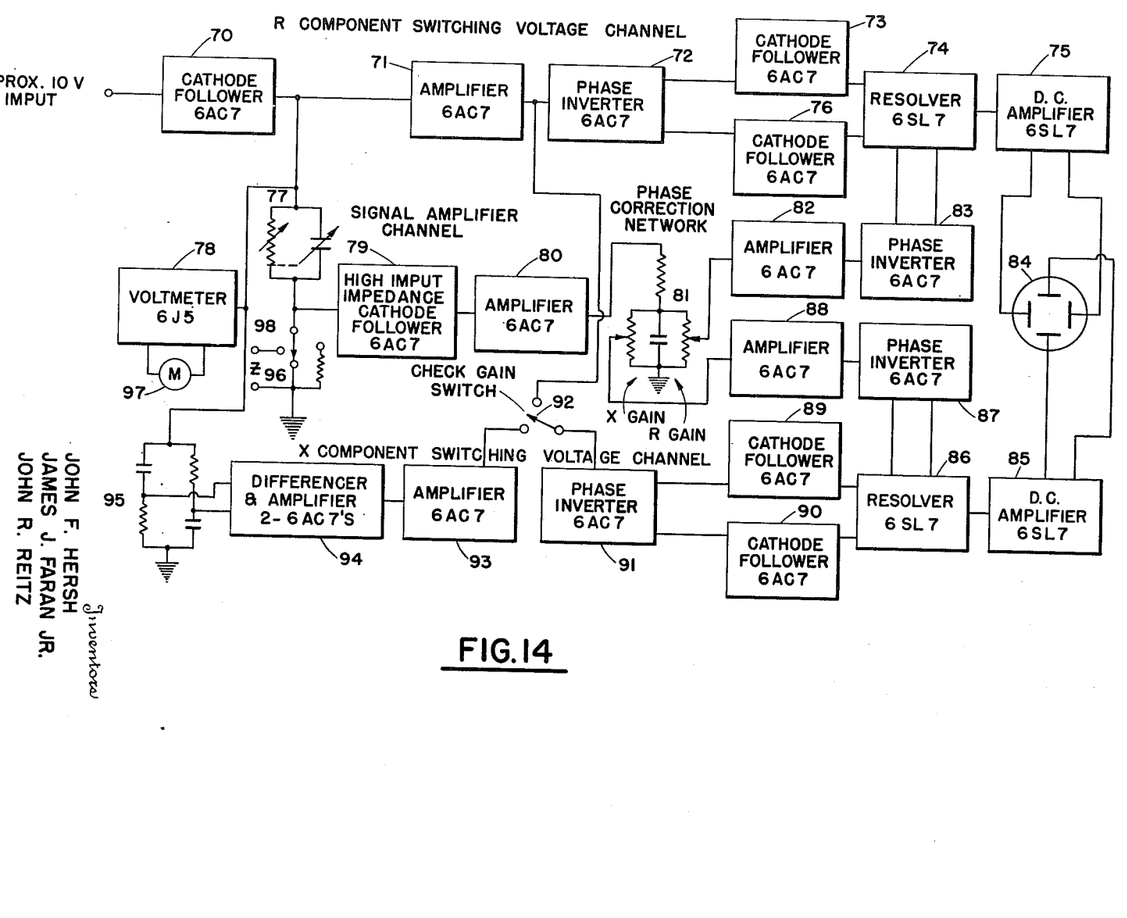
Figure 14 shows a block diagram of a complete system utilizing our invention.
Figure 15A:
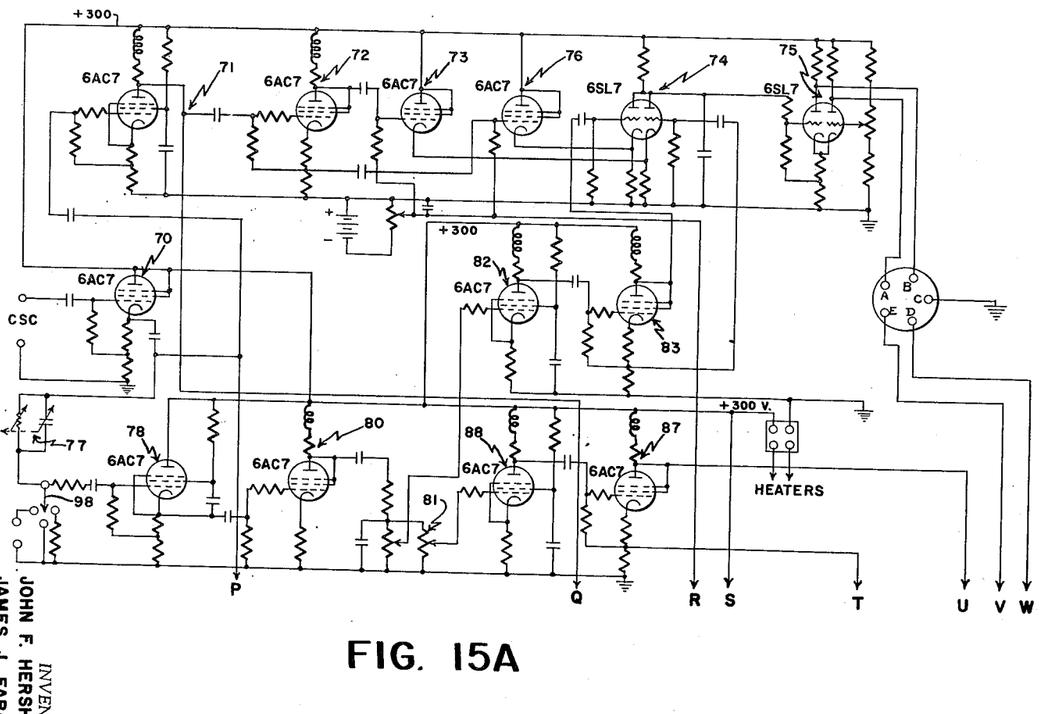

Having described the principal elements of our invention we will now indicate how they may be combined to form a complete impedance plotting system. A block diagram of this system is shown in Figure 14 and a circuit diagram thereof is shown in Figures 15A, B and C. In the figures, 70 is a cathode follower stage adapted to respond to input voltage of the frequency at which an impedance measurement is desired and is used for isolation of the oscillator supplying the signal to the system. Output voltage from cathode follower 70 is supplied to amplifier 71, phase inverter 72, and cathode followers 73 and 76 to resolver 74. In addition, output signals from cathode follower 70 are applied to phase shift network 95, differencer 94, amplifier 93, phase inverter 91, cathode followers 89 and 90, and quadrature component resolver 86. The impedance to be tested, 96, is connected by large resistive impedance 77 to the output of cathode follower 70. The output voltage across impedance 96, E, is applied to cathode follower 79, amplifier 80, and phase correction network 81. One output signal from phase correction network 81 is applied to direct axis amplifier 82, phase inverter 83, and to resolver 74. The voltage from phase correction network 81 is also applied to quadrature axis amplifier 88, phase inverter 87 and resolver 86. The output of resolver 74 is amplified and applied to the horizontal deflection plates of cathode ray tube 84, whereas the output of resolver 86 is applied to direct coupled amplifier 85 and the vertical deflection plates of cathode ray tube 84. Voltmeter 78 in conjunction with meter 97 is provided for measurement of the value of output from cathode follower 70.

Figure 15B:
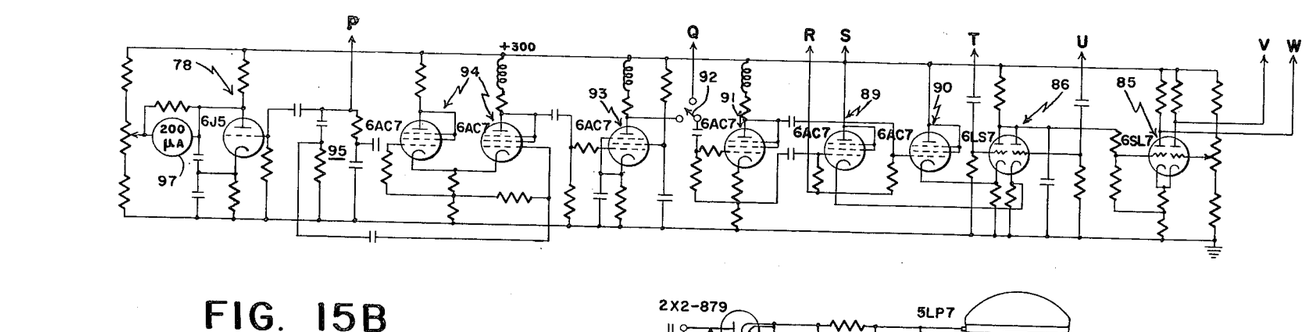
Figure 15C:
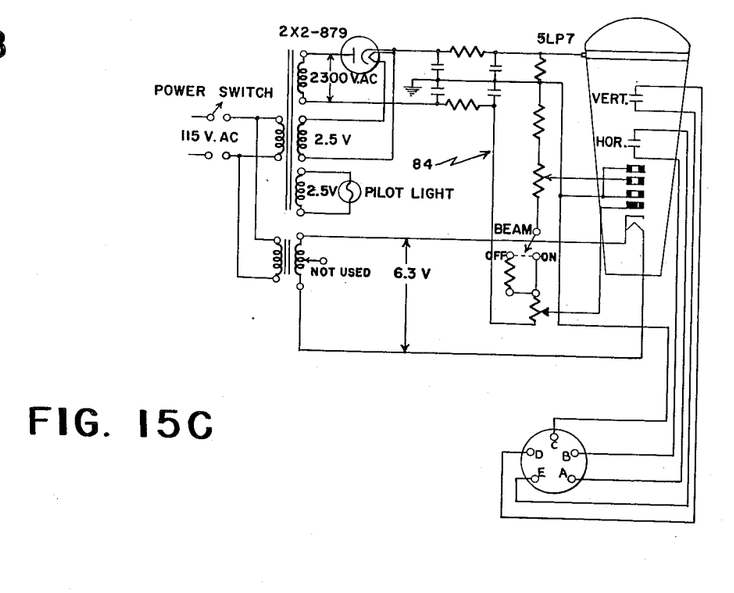

In the operation of the vector impedance locus plotter shown in Figures 14 and 15, the output of cathode follower 70 is first adjusted for the desired value as indicated by meter 97. Resistance 77 is then adjusted to a value at least 100 times the impedance of the test impedance 96. For purposes of test a direct ground connection across the impedance being tested and a 50 ohm known resistive impedance are made available by switch 98. In adjusting the system, these two known values of impedance are used to center the spot on cathode ray tube 84 and properly adjust the reactive and resistance gain by phase correction network 81. Check gain switch 92 provides a further means of balancing the operation of the system. Switch 98 is then turned and measurements conducted.

We claim:

1. An impedance measuring circuit comprising a power source, a resistance, an impedance to be measured, a meter element, and a switch circuit for controlling flow of current to said meter element, said switch circuit including a first and second electron tube, each tube having a cathode, grid, and anode, the cathodes of both tubes being tied together, a common bias resistor connected between said cathodes and ground, a resistor connecting the anode of said second tube to a source of electric potential, a connection between the anode of the first tube and said source of electric potential, a lead to the grid of said first tube whereby the voltage across said power source may be applied between the grid and cathode of said first tube, a lead to the grid of said second tube whereby the voltage across said impedance may be applied between the grid and cathode of said second tube, and an output lead connected directly to the anode of said second tube.

2. An impedance measuring circuit as in claim 1 said switch circuit additionally including a third and fourth electron tube having grid and cathode connections identical with those of said first and second tubes, the plates of said third tube connected to said output lead and the plate of said fourth tube connected to said source of electric potential.

3. An impedance measuring circuit as in claim 2 wherein there is provided fifth and sixth tubes having cathodes tied together and grounded through a common bias resistor, the anodes of the fifth and sixth tubes each connected to second and third anode resistors, the grid of the said fifth tube connected to said output lead, the grid of said sixth tube connected to a potentiometer whereby an adjustable balanced output voltage may be taken from the circuit.

4. An impedance measuring circuit comprising a power source, a resistance, an impedance to be measured, a meter element and a switch circuit for controlling flow of current to said meter, said switch circuit including first and second electron tubes each having a cathode, anode, and grid, each cathode having a cathode resistor connected to ground, each grid having an input lead whereby the voltage across said power source may be applied across the grid and cathode of each tube, the anodes of both tubes connected to a source of electric potential, third and fourth electron tubes having anodes that are tied together and connected to said source of potential through a first anode resistor, fifth and sixth electron tubes having anodes that are tied together and connected to said source of potential through a second anode resistor, the grid of said third tube tied to the grid of said sixth tube, the cathode of said third tube tied to the cathodes of said first and fifth tubes, the grid of said fourth tube tied to the grid of said fifth tube, the cathode of said fourth tube tied to the cathodes of said second and sixth tubes, an input lead from one side of said impedance to said tied grids of the third and sixth tubes, an input lead from the other side of said impedance to said tied grids of the fourth and fifth tubes, and output leads tapped from the anode sides of said first and second anode resistors.

5. An impedance measuring device comprising a power source, an impedance to be measured in series with said power source, resolver circuits connected to said impedance for producing a first voltage proportional to the resistance and a second voltage proportional to the reactance of said impedance, said resolver circuits including at least one switch unit comprising a pair of electron tubes having a common cathode resistance so that current flow in one tube is adapted to produce cut off bias in the other tube.

6. An impedance measuring device comprising a power source, an impedance to be measured in series with said power source, resolver circuits connected to said impedance for producing a first voltage proportional to the resistance and a second voltage proportional to the reactance of said impedance, an oscilloscope having a first set of voltage plates at right angles to a second set of voltage plates, means to apply said first and second voltages across said first and second sets of plates respectively, said resolver circuits including at least one switch unit comprising a pair of electron tubes having a common cathode resistor so that current flow in one tube is adapted to produce cut off bias in the other tube, the anodes of said tubes connected to a common source of potential, an anode resistor in the anode circuit of said other tube so that the potential at the anode side of said anode resistor is at a maximum when said other tube is cut off.

7. In combination, an impedance measuring circuit comprising a voltage source, a resistance and an impedance connected in series relationship, a switcher, a meter element responsive to average voltage, means connecting said switcher and said meter element to said impedance so that said switcher applies a voltage proportional to the voltage drop across said impedance to said meter element when the first named voltage is of a predetermined polarity, a phase shifter, means connecting said phase shifter to said voltage source, a second meter element responsive to average voltage and a second switcher connected to said impedance, said second switcher adapted to apply a quadrature component voltage to said second meter element, said switchers each including a pair of electron tubes having a common cathode resistor so that current flow in a first tube produces cut off bias for the second tube, the anodes of said tubes being connected to a common source of potential, an anode resistor in the anode circuit of said second tube so that the potential at the anode side of said anode resistor is at a maximum when said second tube is cut off.

8. An impedance measuring circuit comprising a serially connected alternating current source of a predetermined voltage and an impedance to be measured, a meter element responsive to average voltage, a switcher connected between said impedance and said meter element for applying a voltage to said meter proportional to the voltage across said impedance when current flow is of predetermined direction, a second meter element responsive to average voltage, a second switcher, means connecting said second meter and said second switcher to said impedance, and a phase shifter connected to said alternating current source for applying a quadrature component voltage to said second meter element, said switchers including a pair of electron tubes having a common cathode resistor so that current flow in a first tube produces cut off bias on a second tube, the anode of said first tube being connected to a common source of potential, an anode resistor in the anode circuit of said second tube so that the potential at the anode side of said anode resistor is a maximum when said other tube is cut off.

9. An impedance measuring device comprising a current source, an impedance to be measured in series relationship therewith, a circuit responsive to average voltage, a switcher connected to said impedance and said circuit for applying voltage to said circuit when current flow in said impedance is of predetermined direction, a second circuit responsive to average voltage, a second switcher connected between said impedance and said circuit for applying a quadrature voltage to said last mentioned circuit when current flow in said impedance is of predetermined direction, a display system connected to said circuits responsive on one axis to the output of said first mentioned circuit and responsive on a second axis at right angles to said first axis to the output of said last mentioned circuit, said switches each including a pair of electron tubes having a common cathode resistor so that current flow in a first tube produces cut off bias for the other tube, the anodes of said first tubes being connected to a common source of potential, an anode resistor in the anode circuit of each of said second tubes so that the potential at the anode side of said anode resistor is at a maximum when said other tube is cut off.

10. An impedance measuring circuit comprising a voltage source, a resistance, and an impedance to be measured in series relationship therewith, a meter element responsive to average voltage, a switcher connected between said impedance and said meter for applying a voltage proportional to the voltage drop across said impedance to said meter when said applied voltage is of predetermined polarity, means for impressing on said impedance a voltage in quadrature with said voltage source and means for applying a voltage of opposite polarity proportional to the voltage drop across said impedance to said meter when said applied voltage is of opposite polarity, said switchers each including a pair of electron tubes having a common cathode resistor so that current flow in a first tube produces cut off bias in the second tube, the anodes of said first tubes being connected to a common source of potential, an anode resistor in the anode circuit of each of said second tubes so that the potential at the anode side of said anode resistor is at a maximum when said other tube is cut off.

References Cited in the file of this patent

UNITED STATES PATENTS

| Number | Name | Date |
| --- | --- | --- |
| 2,081,690 | Unk | May 25, 1937 |
| 2,232,792 | Leven | Feb. 25, 1941 |
| 2,266,509 | Percival et al. | Dec. 16, 1941 |
| 2,406,405 | Salisbury | Aug. 27, 1946 |
| 2,470,412 | Piety | May 17, 1949 |